L. F. KING & H. M. FUNK.
HARVESTER FRAME ADJUSTER.

No. 185,683.  Patented Dec. 26, 1876.

UNITED STATES PATENT OFFICE.

LURANUS F. KING AND HENRY M. FUNK, OF POLO, ILLINOIS.

IMPROVEMENT IN HARVESTER-FRAME ADJUSTERS.

Specification forming part of Letters Patent No. 185,683, dated December 26, 1876; application filed May 8, 1876.

*To all whom it may concern:*

Be it known that we, LURANUS F. KING and HENRY M. FUNK, of Polo, in the county of Ogle and State of Illinois, have invented a new and useful Improvement in Adjustments for Harvester-Frames, of which the following is a specification:

The present invention consists in a stirrup placed over the periphery of the drive-wheel, and provided with holes in the ends, through which a journal is put, the wheel having holes through it to admit of the passage of the journal. To the journal, outside of the stirrup, are fastened chains, which connect with the boxes of the drive-wheel, so that when the journal is rotated by a suitable wrench the frame of the harvester will be elevated, and bring the cutter-bar farther above the surface of the ground. The journal of the drive-wheel is adjustable by means of pins in its boxes, whereby it can be held at the adjusted height.

Figure 1:
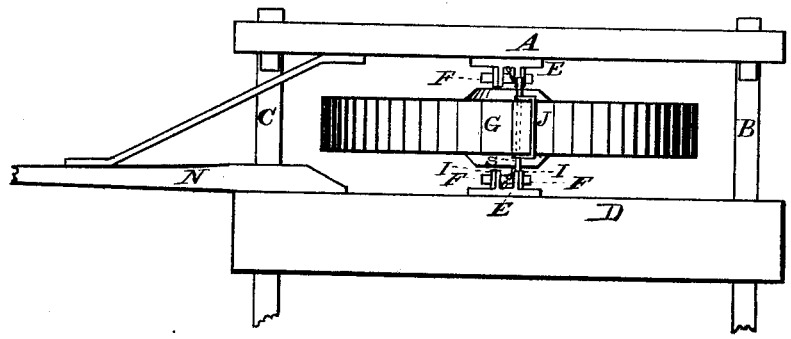
Figure 2:
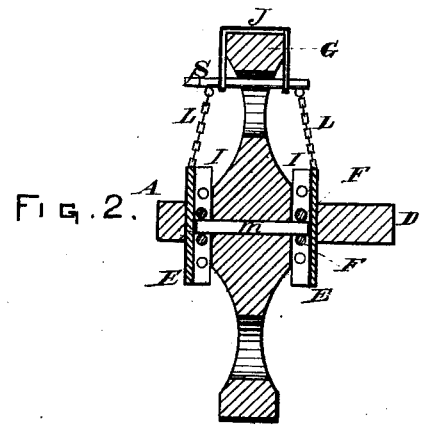

In the drawings, Figure 1 is a plan view of the drive-wheel of a harvester and its supporting-frame, showing also the elevating devices. Fig. 2 is a section of the drive-wheel, taken longitudinally with its axis, showing also the boxes of the wheel, the stirrup, chains, journal, and frame pieces.

G represents the drive-wheel of a harvester, and $m$ is its journal. A B C D is the harvester-frame, supporting the wheel, and N is the tongue. E E I I represent the boxes fastened to the frame, and supporting the journal $m$ of the wheel. The parts or wings I I of the boxes are formed such distance apart as to receive the ends of the journal $m$ and form a guide for it when the frame is elevated or depressed, and the parts E are attached rigidly to the frame-pieces A D. The journal is held in position, when adjusted, by means of pins F F put through holes in the wings I I, as shown in Fig. 2.

The foregoing is a description of those parts of a harvester which are operated on by our improvement, which is as follows: An iron stirrup, J, with holes in its ends, is placed over the periphery of the wheel G, and through the said holes in the stirrup and through a hole in the wheel is placed a journal, S, to whose ends are affixed chains or ropes L, which are attached to the boxes E.

The operation is as follows: In Fig. 2 the shaft $m$ has a central adjustment. Now, to lower the frame A D on the wheel, apply a wrench to the journal S, so as to relieve the upper pins F; then remove said pin and place it in the hole above, turning the journal S to wind the chains L, to bring the journal $m$ up to the position of the replaced pin F. The lower pins F are then removed and placed in the second holes from the top of the boxes E I. To raise the frame, first remove the pins F below the journal $m$, and put them in the lower holes; then draw the chains till the upper pins F can be placed where the lower pins now are. The stirrup, chains, and journal S are removed, or one chain is left affixed to the box for safe-keeping.

We claim as new and desire to secure by Letters Patent—

The combination of the stirrup J, chain L, journal S, guide-boxes E I, shaft $m$, frame A D, drive-wheel G, and pins F, as and for the purpose set forth.

LURANUS F. KING.
HENRY M. FUNK.

Witnesses:
J. D. CAMPBELL,
H. H. SMITH.